(12) United States Patent
Jordan

(10) Patent No.: US 7,357,201 B2
(45) Date of Patent: Apr. 15, 2008

(54) KIT FOR CONVERTING VEHICLE TO TRACKED DRIVEN SNOW VEHICLE

(76) Inventor: Tim Jordan, P.O. Box 892, Donnelly, ID (US) 83615-0892

( * ) Notice: Subject to any disclaimer, the term of this patent is extended or adjusted under 35 U.S.C. 154(b) by 248 days.

(21) Appl. No.: 10/964,960

(22) Filed: Oct. 14, 2004

(65) Prior Publication Data

US 2005/0077094 A1 Apr. 14, 2005

Related U.S. Application Data

(60) Provisional application No. 60/510,433, filed on Oct. 14, 2003.

(51) Int. Cl.
B62D 55/04 (2006.01)
B62D 55/07 (2006.01)

(52) U.S. Cl. .................. 180/9.26; 305/168; 305/169

(58) Field of Classification Search .............. 180/9.26, 180/9.3, 9.25, 9.64, 9.62, 196; 280/7.14, 280/12.1; 305/168, 169
See application file for complete search history.

(56) References Cited

U.S. PATENT DOCUMENTS

| | | | | |
|---|---|---|---|---|
| 3,336,994 A | * | 8/1967 | Pederson | 180/9.62 |
| 3,412,821 A | * | 11/1968 | Humphrey | 180/9.64 |
| 4,502,560 A | * | 3/1985 | Hisatomi | 180/190 |
| 4,613,006 A | * | 9/1986 | Moss et al. | 180/9.25 |
| 4,719,983 A | * | 1/1988 | Bruzzone | 180/184 |
| 5,102,153 A | | 4/1992 | Rhode | |
| 5,423,559 A | * | 6/1995 | Rhode | 280/12.14 |
| 5,474,146 A | * | 12/1995 | Yoshioka et al. | 180/184 |
| 5,738,361 A | * | 4/1998 | Landucci | 280/12.14 |
| 6,112,840 A | | 9/2000 | Forbes | |
| 6,164,670 A | | 12/2000 | Abarca et al. | |
| 6,279,923 B1 | * | 8/2001 | Cardillo et al. | 280/12.14 |
| 6,431,666 B2 | * | 8/2002 | Courtemanche | 305/168 |
| 6,863,142 B2 | * | 3/2005 | Corbeil | 180/185 |
| 7,182,165 B1 | * | 2/2007 | Keinath et al. | 180/185 |

* cited by examiner

Primary Examiner—Tony Winner
(74) Attorney, Agent, or Firm—Robert L. Shaver; Dykas, Shaver & Nipper, LLP

(57) ABSTRACT

The invention is a conversion kit for converting a conventional two-wheeled vehicle, such as a bicycle or motorcycle, into a tracked vehicle for use on snow, mud and sand. The kit converts the vehicle without major modifications to the vehicle, and the vehicle may be converted back to two-wheeled use easily. The tracked version is powered by the original vehicle drive system, and uses the vehicles braking and suspension system.

16 Claims, 2 Drawing Sheets

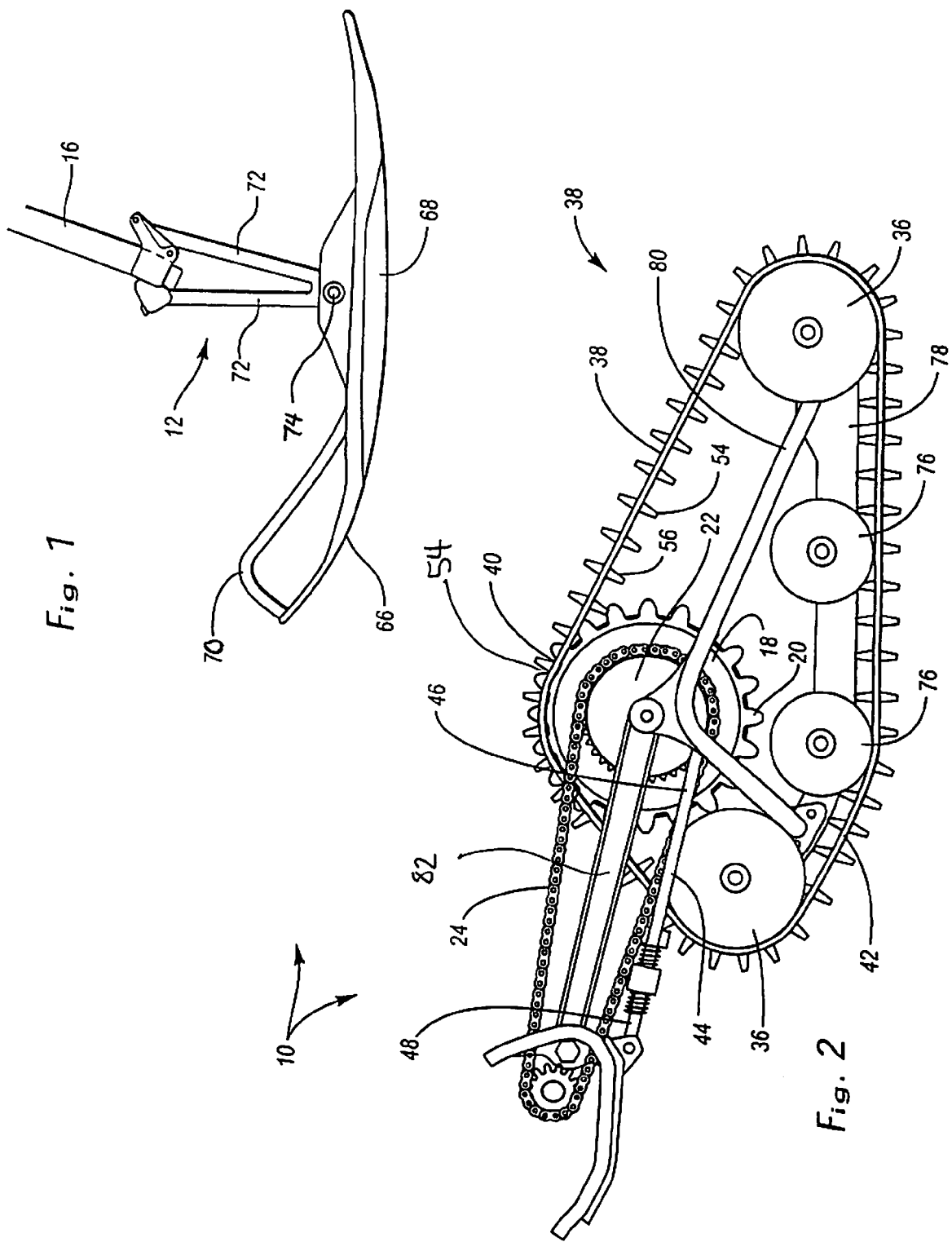

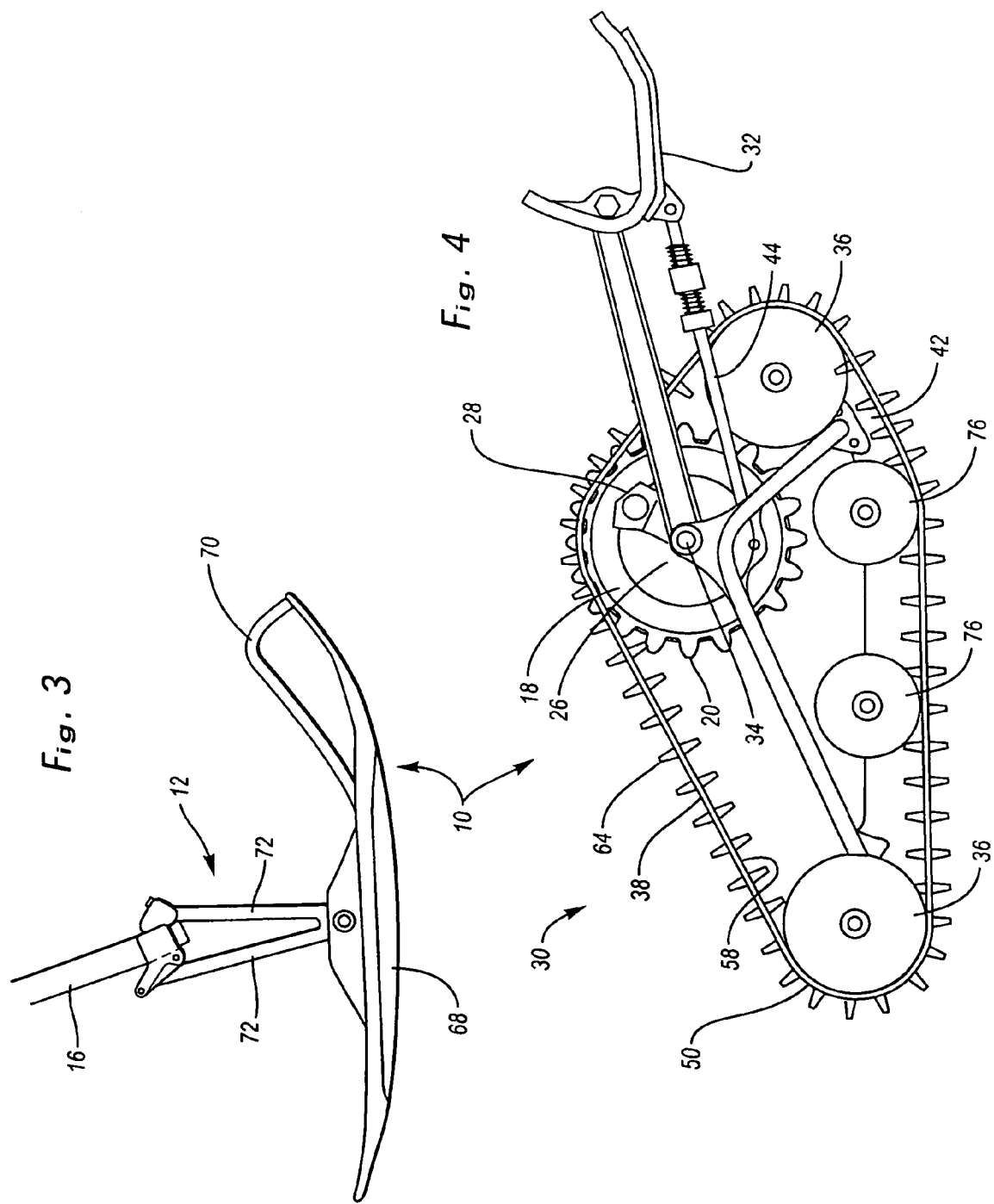

KIT FOR CONVERTING VEHICLE TO TRACKED DRIVEN SNOW VEHICLE

PRIORITY

This application claims the priority date of the provisional application entitled SNOW CYCLE CONVERSION KIT filed by Timothy James Jordan on Oct. 14, 2003 with application Ser. No. 60/510,433.

BACKGROUND OF THE INVENTION

1. Field of the Invention

The present invention generally relates to tracked snow vehicles, and more particularly to two-wheeled tracked snow vehicles and conversion kits for creating them.

2. Background Information

The presence of snow in the wintertime severely restricts operators of two-wheeled vehicles from using their vehicles in the winter. Although other options are available, such as snowmobiles, there are no satisfactory two-wheeled vehicles for use in the winter. There are several versions of two-wheeled vehicles that attempt to provide a device that is similar in operation to a bicycle or a motorcycle, but configured for winter use. These can be gravity-powered devices on which a user straddles a frame and slides down a ski slope, and uses a steering wheel with an attached ski to navigate the hill. There are other devices that are similar to a motorcycle in configuration.

What is lacking in the prior art is a conversion kit for converting a two-wheeled vehicle, either a motorcycle or bicycle, into a tracked vehicle that can operate in the snow. Such a kit would also have the capability of being easily converted back into a two-wheeled vehicle. Such a conversion kit should include components that do not require serious modifications of the two-wheeled vehicle, such as by welding or cutting. Such conversion kits should be able to be bolted on with minimal complication.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects are achieved by the snow vehicle conversion kit of the invention. This conversion kit is made for converting a two-wheeled vehicle into a tracked snow vehicle. The two-wheeled vehicle can be a motorcycle or bicycle. The conversion kit includes a ski and strut assembly which replaces the front wheel of the vehicle by attaching to the front fork assembly of the vehicle. The kit also includes a track assembly, which is mounted in place of the rear wheel of the vehicle. The track assembly includes a drive gear that replaces the rear wheel of the vehicle. The drive gear has track drive teeth around its circumference, and a drive sprocket that is attached to it. The drive sprocket interfaces with the drive chain of the motorcycle or vehicle. The drive gear includes a braking surface that is congruent with the brake system of the vehicle. This can take the form of a smooth surface that is acted upon by brake pads of the vehicle's brake system. The braking surface can also take the form of a disc, which is acted upon by the disc brake system of the vehicle.

The track assembly includes a track assembly frame that is rotatably mounted to the vehicle frame at the rear axle of the vehicle. The track assembly includes a number of idler wheels in pairs and an endless loop track. The endless loop track has openings or windows in the track. These windows are configured so that they interfit with the track drive teeth of the drive gear. In this way, the propulsion system of the vehicle is directly transferred through the drive gear to the track of the track assembly. A slider is also present, which is adjacent to the track on its circumference. The slider presses against the track and forms the leading edge of the track profile where the track profile first encounters snow. Thus, the slider forces the track to form a curve as it first interfaces with the snow. For operation in mud or snow the sliders may be removed to eliminate friction.

The snow vehicle conversion kit can also include one or more control rods. The control rods have a first end and a second end, with the first end connected to the vehicle frame and the second end connected to the track assembly frame. The control rods, if present, tend to pull the track assembly frame towards the under carriage of the vehicle. This causes it to rotate so that the tail of the track moves down and the front of the track moves up. The purpose of this is to spread the weight of the vehicle and rider over the entire track, and not just have the weight be transferred from the axle directly to the track below the axle. This is necessary because the track must be narrow enough to fit between the existing frame members of the vehicle. Since the track is fairly narrow, in order to obtain enough surface area for support of the vehicle and rider and for propulsion in snow, the track surface touching the snow has to be fairly long. Without control rods pressing the rear of the track down, the track would not be uniformly weighted across its length where it touches the snow.

The control rods are configured so that if the vehicle becomes totally airborne, the track assembly is not allowed to rotate completely towards the under carriage of the vehicle. Thus, the control rod limits the distance that the rear of the track assembly can move in either a downward or an upward direction. Some flexibility in an upward direction is desirable so that the track can conform to contours and bumps in the snow that it is traveling over.

The track can have metal clips built into the track, with the metal mounted to the interior of the track and extending into the track windows. The purpose of the metal clips is to reinforce the track windows to make them stronger against pressure and wear from the drive gear. The part of the metal clips that extends onto the interior of the track is formed into ridges on the track, which are generally perpendicular or normal to the track.

The track assembly includes a number of idler wheels that are typically mounted in pairs on the track frame. The idler wheels contact the interior of the track adjacent to the ridges formed by the metal clips. The idler wheels can also interfit with lugs molded into the track. Thus, the idler wheels travel on either side of the clips, and the idler wheels and the clips and or lugs help to keep the track centered.

The invention also includes a method of converting a two-wheeled vehicle into a tracked driven snow vehicle. The method involves the steps of attaching a ski and strut assembly to a conventional two-wheeled vehicle in place of the front wheel of the vehicle. To accomplish this, the ski and strut assembly are attached to the front fork assembly of the vehicle. The next step involves removing the rear wheel of the two-wheeled vehicle and installing in its place a drive gear. The drive gear has drive teeth around its circumference for driving the track. The drive gear also has an attached drive sprocket that is designed to interface with the drive chain of the vehicle. The drive gear also has a braking surface that is designed to interface with the braking system of the vehicle, whether that is caliper brakes, disc brakes or other types of brakes.

The next step involves installing a track assembly to the frame of the vehicle. This is done by attaching a track assembly frame at the rear axle of the vehicle. The track assembly frame is designed to be able to rotate around the axle of the vehicle. The track assembly includes an endless loop track with holes or windows in the track with the purpose of interfacing with the drive gear, with the track drive teeth of the drive gear extending at least partly through the holes or windows in the endless loop track. The track assembly frame also has a slider on the leading and interior side of the track.

The method can also include the steps of adding one or more control rods attached between the vehicle frame and the track assembly frame, for controlling the rotation movement of the track assembly frame. Its purpose is to pull the track assembly frame down under normal circumstances to help spread the weight of the rider and vehicle fully onto all parts of the drive track. It also serves to limit the amount that the track assembly frame can rotate in either direction, for instance, when the vehicle is airborne or when it is conforming to several depressions in the snow that it is traveling over.

The continuous loop track that is installed in the previous step is narrow enough that it fits between the frame members of the conventional two-wheeled vehicle, whether that be the rear wheel stays of a bicycle or the swing arms of a motorcycle.

The step of installing the endless loop track can further include the step of installing an endless loop track that has metal clips built into it. The metal clips extend at least partly into the holes or windows in the track, and add durability and strength at the place where the drive gear is pressing against the side of the windows of the track. Part of the metal clip is also formed into ridges, which are generally perpendicular or normal to the track. The track assembly frame includes paired idler wheels that are placed so that they roll on the track on opposite sides of the ridges. Thus, the ridges and the idler wheels assist in keeping the track centered and stable.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 1 is a side view of the right side of the ski/strut assembly of the invention.

FIG. 2 is a view of the right side of the track assembly of the vehicle of the invention.

FIG. 3 is a side view of the left side of the ski/strut assembly of the invention.

FIG. 4 is a view of the left side of the track assembly of the vehicle of the invention.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The invention is a kit that converts a two-wheeled vehicle, such as a standard bicycle or motorcycle, into a tracked driven vehicle that can be operated on ski slopes, cross country ski trails or snow covered roads. The kit 10 includes a track drive system that replaces the rear wheel and a ski/strut assembly that replaces the front wheel. Once installed, the bicycle can be ridden and steered and feels just like the normal bike or motorcycle. The use of a track and ski allows the vehicle to be operated in conditions that a standard two-wheeled vehicle could not operate on, including mud, sand, water logged ground and snow. When conditions change (such as a spring thaw) the vehicle can be converted back to a conventional bicycle or motorcycle.

The first step of installing the kit 10 is to remove the conventional front wheel of a bicycle or motorcycle, and replace it with the ski/strut assembly 12. The ski can take a number of configurations, but a preferred form of the ski/strut assembly 12 is for the ski to be approximately 40 inches long, made of steel, and having a central ridge 68 or dual ridges on each side of the ski that are approximately 1 inch high. The central ridge 68 provides grip in the snow when the ski is turning. The ski is preferably 5.5 inches wide. It further includes a stiffening bar 70, which can also be used as a handle. The ski/strut assembly 12 is preferably attached to the front fork assembly 16 of the vehicle and includes strut arms 72 which rotatably attach to the ski 66 at a ski axle. The strut arms 72 are preferably made of steel alloy or aluminum tubing. In the case of a conversion kit for a bicycle, the ski would be similar to a downhill ski, with metal edges that would grip the snow when turning. The ski would be preferably about 30 inches long, and 3.5 inches wide.

Next, the rear wheel is unbolted and replaced with the track assembly of the invention. Depending on what type of brake the vehicle is equipped with, a simple brake replacement may be required. Replacement brake equipment is included in the kit 10. No drilling, cutting, welding or other alterations are required. A drive wheel 18 is installed in place of the vehicle rear wheel. The drive wheel 18's preferred configuration for a bicycle is a drive wheel that is 20 inches in diameter and 0.5 inches wide. It preferably has 62 track drive teeth 20 around its circumference, which extend about 0.5 inches from the edge of the drive wheel 18. For a bicycle, the drive wheel 18 is preferably made of plastic, although a number of other materials can be utilized such as aluminum alloys, carbon fiber and composite materials. A drive wheel 18 for a motorcycle is preferably 16 inches in diameter and 1 inch wide. A preferred configuration of the drive wheel 18 for a motorcycle is one that has 19 track drive teeth 20 around its circumference, with each track drive tooth extending approximately 1 inch from the surface of the drive wheel 18. The preferred drive wheel 18 for a motorcycle is made of plastic, but other materials could also be utilized such as steel, titanium, Kevlar, aluminum, carbon fiber and composite material. The drive wheel 18 preferably has a braking surface 26, which interfits with the braking system 28 of the vehicle.

An endless loop track 38 runs over the drive wheel 18 and the track drive teeth 20. Windows or openings 40 on the endless loop track 38 interfit with the track drive teeth 20 to allow the drive wheel 18 to power the track 38. The preferred embodiment of a track 38 must be narrow enough to fit between the rear stays of a bicycle or between the swing arms 82 of a motorcycle. For a bicycle, a preferred track 38 is 2.25 inches wide and contains approximately 80 windows 40. Each window 40 is generally rectangular, and is approximately 0.5 inches wide by 0.5 inches long. The track 38 itself is 2.25 inches wide and has a circumference of approximately 80 inches. The preferred track 38 is made of material similar to snowmobile tracks, and is approximately 0.125 inches thick. The track 38 includes metal clips 54, which extend into the windows 40. The metal clips 54 are formed into a semi-cylindrical ridge 56 on the inside circumference of the track 38, also called the track interior 58. The portion of the metal clip 54 that extends into the window 40 of the track 38 serves to reinforce the side of the window 40 that the track drive teeth 20 press against. The portion of the metal clip 54 which is formed into a ridge 56 on the inner circumference of the track 38 serves to help the idler wheels 36 to keep the track 38 centered on the track frame. The conversion kit 10 for motorcycles uses a track with 48 windows 40, is 6.25 inches wide, and 0.25 inches thick, and 121 inches in circumference. The windows are about 1.125 inches by 1.5 inches long. The track 38 has lugs or treads 64, which extend out from the track.

By using a single ski in place of the front wheel, and a continuous belt or track supported by a track frame 78 in place of the rear wheel, the footprint or contact zone of the vehicle is significantly increased. By spreading the weight of the rider and the vehicle over a larger area, flotation is increased in soft snow or ground conditions. An added benefit of this increased flotation is that it decreases the damage or ruts left by a wheel sinking into the snow. This is important because damage to ski slopes and trails would force limited access to such areas. By being environmentally friendly, access to these areas can be opened to riders of vehicles equipped with a conversion kit 10 of the invention.

The track is driven or pulled up from idler wheels 36 located at the rear of the track assembly 30. The track 38 runs under these idler wheels 36 where the track 38 is in contact with the snow. The track 38 runs forward under support wheels 76 that keep the track 38 in contact with the snow. The track 38 runs under another set of idler wheels 36 located at the front of the track frame 78, then runs up at an angle to a third set of idler wheels 36 that are located forward and above the second set of idler wheels. This gives the track an approach angle allowing the track to compact and climb over lumps of snow or other obstacles. The track 38 then angles back up to the drive wheel 18. For a kit 10 for a motorcycle, the idler wheels 36 are in two pairs with a preferred diameter of 5.25 inches for the front pair, and 7 inches for the rear pair. The support wheels 76 are preferably 5.25 inches in diameter.

The track frame 78 is supported by frame struts 80 that attach to the track frame in the front and rear, and then angle up and intersect at the drive wheel axle 34. These frame struts 80 pivot on the axle 34, allowing the track frame 78 to move in relation to the terrain, but allows the belt to be kept in constant tension. The track frame 78 attaches to the vehicle frame 32. The track frame 78 includes a slider 42, which is adjacent to the track on its circumference. The slider presses against the track and forms the leading edge of the track profile where the track profile first encounters snow. Thus, the slider forces the track to form a curve as it first interfaces with the snow. For operation in mud or snow the sliders may be removed to eliminate friction. The preferred embodiment of the snow vehicle conversion kit can also include one or more control rods 44. The control rods have a first end 46 and a second end 48, with the first end connected to the vehicle frame and the second end connected to the track assembly frame. The control rods, tend to pull the track assembly frame towards the under carriage of the vehicle. This causes it to rotate so that the tail or rear of the track 50 moves down and the front of the track moves up. The purpose of this is to spread the weight of the vehicle and rider over the entire track, and not just have the weight be transferred from the axle directly to the track below the axle. This is necessary because the track must be narrow enough to fit between the existing frame members of the vehicle. Since the track is fairly narrow, in order to obtain enough surface area for support of the vehicle and rider and for propulsion in snow, the track surface touching the snow has to be fairly long. Without control rods pressing the rear of the track down, the track would not be uniformly weighted across its length where it touches the snow.

Attached to the drive wheel 18 is a standard bicycle free wheel or sprocket, or a motorcycle drive sprocket 22. Multi speed gear clusters or single speed gears are both compatible with the drive wheel 18. As the chain 24 of the vehicle is driven, the drive wheel 18 is caused to rotate. The drive wheel 18 then pulls the track 38 around the idler wheels 36, causing the vehicle to move forward as the track 38 exerts force against the snow surface below it. Braking is achieved by using standard braking components of the bicycle or motorcycle. Disc brakes, V-brakes, cantilever brakes, drum brakes or caliper brakes may be accommodated with the drive wheel 18 of the invention.

Steering is achieved by a ski 66 that is mounted in place of the front wheel of the vehicle. The ski 66 is part of the ski/strut assembly 12. One or more struts 72 bolt onto the vehicle's front fork assembly 16 at the axle mounts and front brake attachment points. At the base of the strut a ski 66 is attached at a ski axle 74. The ski 66 pivots at the ski axle 74, allowing the ski 66 to follow the terrain. By using the angle or rake of the bicycle or motorcycle frame and fork, when the handlebars turn, the ski 66 is caused to roll which allows the ski edge to bite into the snow.

The current trend in mountain biking is towards dual suspension bikes, that is bikes with a shock absorber built into the frame and the forks. Motorcycles also have dual suspension, and their swing arms and front forks have shock absorbing mechanisms built into them. This style of mountain bike or motorcycle is very compatible with the conversion kit 10 of the invention. Since the frame of the vehicle already has suspension built into it, the conversion kit of the invention does not need to have suspension. This makes the conversion kit simpler and less expensive. Since the snow surfaces are softer than roadway surfaces, the built-in suspension of the vehicle also contributes to a smoother ride and makes additional suspension in the conversion kit 10 unnecessary.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A snow vehicle conversion kit for converting a two-wheeled vehicle to a tracked snow vehicle, comprising:
   a ski and strut assembly which replaces the front wheel of the vehicle by attaching to the front fork assembly of the vehicle;
   a drive gear which replaces a rear wheel of the vehicle, said drive gear having track drive teeth around its circumference, an attached drive sprocket which interfaces with a drive chain of the vehicle, and a braking surface congruent with a brake system of the vehicle; and
   a track assembly mounted to the frame of the vehicle, comprising a track assembly frame rotatably mounted to the vehicle frame at a rear axle of the vehicle, a plurality of idler wheels, an endless loop track defining windows in said track, which is configured for interfitting with said track drive teeth of said drive gear for propulsion, a generally linear slider extending from adjacent a leading idler wheel of said track to adjacent a trailing idler wheel for holding said track to a curved shape and at least one control rod, with a first and a second end, connected to the vehicle frame at the first end and to the track assembly frame at the second end, for pulling the rear of the track assembly down, but limiting the distance the rear of the track assembly can move in a downward and an upward direction.

2. The snow vehicle conversion kit of claim 1 in which said track has metal clips on the interior of the track, with part of the metal clips extending into the track windows for reinforcing said track windows and forming ridges on the track interior normal to the track.

3. The snow vehicle conversion kit of claim 1 in which said frame members of said vehicle are rear wheel stays of a bicycle.

4. The snow vehicle conversion kit of claim 3 in which said brake surface is congruent with caliper brakes of said bicycle.

5. The snow vehicle conversion kit of claim 1 in which said frame members of said vehicle are swing arms of a motorcycle.

6. The snow vehicle conversion kit of claim 5 in which a plurality of idler wheel pairs are mounted to the track frame, and contact the interior of the track adjacent to the ridges.

7. The snow vehicle conversion kit of claim 1, which includes a slider attached to the track frame, and mounted to impart a curve to said track at a leading side of said track.

8. The snow vehicle conversion kit of claim 1, which includes a brake disk that interfaces with a disk brake of said vehicle.

9. A method of converting a two-wheeled vehicle into a track driven snow vehicle, said method comprising the steps of:
   attaching a ski and strut assembly to a conventional two-wheeled vehicle, in place of the front wheel of the vehicle, by attaching the ski and strut assembly to the front fork assembly of the vehicle;
   removing the rear wheel of said conventional two-wheeled vehicle, and installing in its place a drive gear, said drive gear having track drive teeth around its circumference, an attached drive sprocket which interfaces with a drive chain of the vehicle, and a braking surface congruent with the brake system of the vehicle; and
   installing a track assembly by attaching said track assembly to the frame of the vehicle, said track assembly comprising a track assembly frame rotatably mounted to the vehicle frame at the rear axle of the vehicle, a plurality of idler wheels, an endless loop track defining windows in said track, which is configured for interfitting with said track drive teeth of said drive gear for propulsion, and a slider adjacent part of said track
   installing at least one control rod, with a first and a second end, connected to the vehicle frame at the first end and to the track assembly frame at the second end, for pulling the rear of the track assembly down, but limiting the distance the rear of the track assembly can move in a downward and an upward direction.

10. The method of convening said two-wheeled vehicle into a track driven snow vehicle of claim 9, which includes the step of installing a continuous track in which said track has metal clips on the interior of the track, with part of the metal clips extending into the track windows for reinforcing said track windows and forming ridges on the track interior normal to the track.

11. The method of convening said two-wheeled vehicle into a track driven snow vehicle of claim 9, which further includes the step of installing said continuous loop track between the rear wheel stays of a bicycle.

12. The method of convening said two-wheeled vehicle into a track driven snow vehicle of claim 11, which further includes the step of installing a drive gear with a braking surface that is congruent with caliper brakes of said bicycle.

13. The method of converting said two-wheeled vehicle into a track driven snow vehicle of claim 9, which further includes the step of installing said continuous loop track between the rear swing arms of a motorcycle.

14. The method of converting said two-wheeled vehicle into a track driven snow vehicle of claim 9, which further includes the step of installing a plurality of idler wheel pairs mounted to the track frame, which contact the interior of the track adjacent to the ridges.

15. The method of converting said two-wheeled vehicle into a track driven snow vehicle of claim 9, which further includes the step of installing said slider so that said slider is attached to the track frame, and mounted to impart a curve to said track at a leading side of said track.

16. The method of converting said two-wheeled vehicle into a track driven snow vehicle of claim 9, which further includes the step of installing a brake disk with said drive gear, which interfaces with a disk brake of said vehicle.

\* \* \* \* \*